US005446255A

United States Patent [19]

Blondy et al.

[11] Patent Number: 5,446,255

[45] Date of Patent: Aug. 29, 1995

[54] EXPERT SYSTEM FOR PLASMA TORCH

[75] Inventors: Alain Blondy, Gradignan; Jean-Marie F. Lambert, Saint Medard En Jalles, both of France

[73] Assignee: Societe Anonyme dite: Aerospatiale Societe Nationale Industrielle, Paris, France

[21] Appl. No.: 28,245

[22] Filed: Mar. 9, 1993

[30] Foreign Application Priority Data

Mar. 27, 1992 [FR] France .............................. 92 03736

[51] Int. Cl.[6] .............................................. B23K 9/00

[52] U.S. Cl. .......................... 219/121.54; 219/121.48; 219/121.57

[58] Field of Search ...................... 219/121.54, 121.55, 219/121.57, 75, 121.48, 130.4, 130.1

[56] References Cited

U.S. PATENT DOCUMENTS 5,091,625 2/1992 Kohdu et al. .................. 219/121.54
5,208,436 5/1993 Blankenship .................. 219/121.54

FOREIGN PATENT DOCUMENTS 0364151 4/1990 European Pat. Off. .
0428135A2 5/1991 European Pat. Off. .
0021888 1/1981 France .
0289423 11/1988 France .
0053774 3/1989 Japan ............................ 219/121.54

*Primary Examiner*—Mark H. Paschall
*Attorney, Agent, or Firm*—Marshall, O'Toole, Gerstein, Murray & Borun

[57] ABSTRACT

Maintenance aid device (1) for a plasma torch (2) affected by a breakdown, comprising an expert system (3) successively determining subassemblies (4) of said torch (2), of decreasing size, likely to contain the brokendown element, by means of questions (QU) relating to the state of certain subassemblies (4), the response to these questions (QU) by an operator (14) being facilitated by the fact that said maintenance aid device (1) includes addressing means (10) able to read from a documentary base (8), and to display, information relating to a determined subassembly (4).

Maintenance of complex plasma torches and use of a unique knowledge structure of the latter for other expertise besides breakdown repair.

6 Claims, 3 Drawing Sheets

EXPERT SYSTEM FOR PLASMA TORCH

The present invention relates to a maintenance aid device using an expert system, especially intended for plasma torches.

BACKGROUND

It is known that plasma torches have a complex structure, consisting of an electrical system, a pneumatic system, and a hydraulic system, so that their maintenance requires the services of very well qualified technicians highly competent in electricity, in pneumatics and in hydraulics. This results in such maintenance being particularly expensive.

Moreover, maintenance aid devices are already known for apparatus including an expert system capable, from a knowledge base describing elements linked together constituting an apparatus and the corresponding topology of the links, and of rules governing their behavior, of deducing the identity of a defective element of said apparatus from observation of the state of a certain number of these elements. In effect, these defective elements give rise to the existence of an abnormal state for a certain number of observable elements which are, a priori, all suspect, which defines a subassembly from among the elements as a whole. The size of this subassembly is progressively reduced by successive deductions by the expert system, these deductions being arrived at by means of a dialog with an operator who has to supply information in response to questions posed by this expert system and allowing him to resolve the ambiguities as to the possibility of breakdown in the suspect elements. He thus arrives at a routeing, including, at each step, called node, a subassembly of suspect elements, said information making it possible to pass, via one branch of this routing, to a downstream node relating to a part of the subassembly, the elements of the eliminated part of this subassembly no longer being suspect. Hence, in principle, a subassembly of reduced size, such as an electronic module or a defective component, is identified.

This routeing, as set out above, is however fairly theoretical since, in practice the choice of said branches cannot be made in an entirely deterministic way, since the number of possible observations of the elements is limited. That being so, said information supplied by the operator often makes it possible only to obtain a probability of the presence of a breakdown in a subassembly, switching the routeing to one branch of a node in preference to another. That being so, the expert system, or the operator, may be led to an impasse, making it necessary to set off again to the, or an, upstream node and explore other branches.

Moreover, for supplying information to the expert system or repairing the apparatus, the human operator has to consult documentation, such as diagrams, documentation from the manufacturer of the various elements, or repair sheets, which are often very voluminous and non-uniform, which does not give this operator an overall view. The quality of said information supplied and that of the repair then run the risk of depending on the qualification of the operator, while the time spent in research will be considerable if the apparatus is complex.

From the above it therefore results that, as a consequence of the complexity of a plasma torch, it would be difficult, if not impossible, to use a known maintenance aid device for maintenance of such a plasma torch.

DESCRIPTION OF THE INVENTION

The object of the present invention is to overcome this drawback and to make it possible to adapt a known maintenance aid device to use for plasma torches.

To this end, according to the invention, the maintenance aid device for a plasma torch consisting of a plurality of subassemblies of electrical, pneumatic and hydraulic elements, including:

- a knowledge base describing said elements and the topology of their links in said subassemblies;
- an expert system able to carry out successive steps of determination of subassemblies of said torch; and
- a dialog interface between an operator and said expert system, said interface being able to send out questions posed by said expert system for said operator, and to receive from said operator information intended for said expert system in response to said questions; is noteworthy in that it includes:
  - a documentary base consisting of a plurality of files relating to specific technical features of said elements;
  - addressing means able to receive-data identifying a defined element from the dialog interface, to read the information relating to this defined element in said documentary base, and to supply the latter information to said dialog interface; and
  - first calculating means preferably able to choose, at any step, a subassembly corresponding to information which is most easily accessible by the operator.

Said information relating to the specific technical features of said elements, contained in the documentary base are, for example, the data from the manufacturer of the said elements, test and repair sheets, diagrams, reliability information, etc.

The device according to the invention thus gives the operator the information necessary for the expert system, this operator having no further need to search, among the assorted documentation, for the information relating to a subassembly corresponding to a node for which questions are posed. Being comprehensively informed, the operator can carry out the pertinent observations relating to the questions posed and precisely and rapidly supply the information to the said maintenance aid device.

In order to lighten the operator's workload, said addressing means may moreover be advantageously able automatically to receive said questions relating to the state of certain subassemblies and to read the information relating to these subassemblies in said documentary base.

It will, moreover, be noted that the operator may, by virtue of the invention, consult said documentary base for other ends than repair, for example in order to carry out a documentation search, a search for repair files relating to said elements or else an item of information on said torch with the assistance of the device in accordance with the invention. The knowledge base and the documentary base form a single knowledge structure capable of being utilized for numerous purposes other than repair. Hence an effective, quality device is obtained.

Said first calculating means, preferably able to choose, at any step, a subassembly corresponding to information which is most easily accessible by the operator, make it possible to determine the defective subassembly more rapidly. Hence, the elements which are most easily accessible by the operator are dealt with, that is to say elements easily observable in the suspect subassembly, which makes it possible to identify them very rapidly if one of them is defective, and rapidly to reduce the size of the suspect subassembly if they are not defective.

As he uses the device in accordance with the invention, the operator acquires supplementary knowledge about the torch being serviced, or else builds on his initial knowledge. Hence, it is advantageous for the device in accordance with the invention to include means for inserting supplements and/or modifications to the previously stored knowledge into said knowledge base.

The supply of information requested by the expert system may be further facilitated by using second calculating means able to read a defined procedure automatically in said documentary base, so that an operator can acquire said information. The latter thus does not have to search for the particular operating procedure in order to obtain this information, which gives rise to a saving in time and an absence of operating error.

In order to keep the operator better informed, this maintenance aid device may include third calculating means able to indicate a probability relative to a level of confidence which it attributes to said definition of the defective subassembly.

Moreover, so as to link together the search for the possible defective subassemblies, this maintenance aid device may include fourth calculating means able to cause any step of subassembly determination to return to a previous step.

The effectiveness of this maintenance aid device may be improved as time goes by by using memory means able to store the history of the succession of said steps. It is thus possible to constitute a database allowing statistics to be produced, so as to determine the occurrence frequencies of breakdowns and the nonoptimal or ineffective routeings, and consequently to correct the rules determining the routeing.

DESCRIPTION OF THE DRAWINGS

The figures of the attached drawing will clearly show how the invention can be produced.

DETAILED DESCRIPTION OF THE INVENTION

Figure 1:
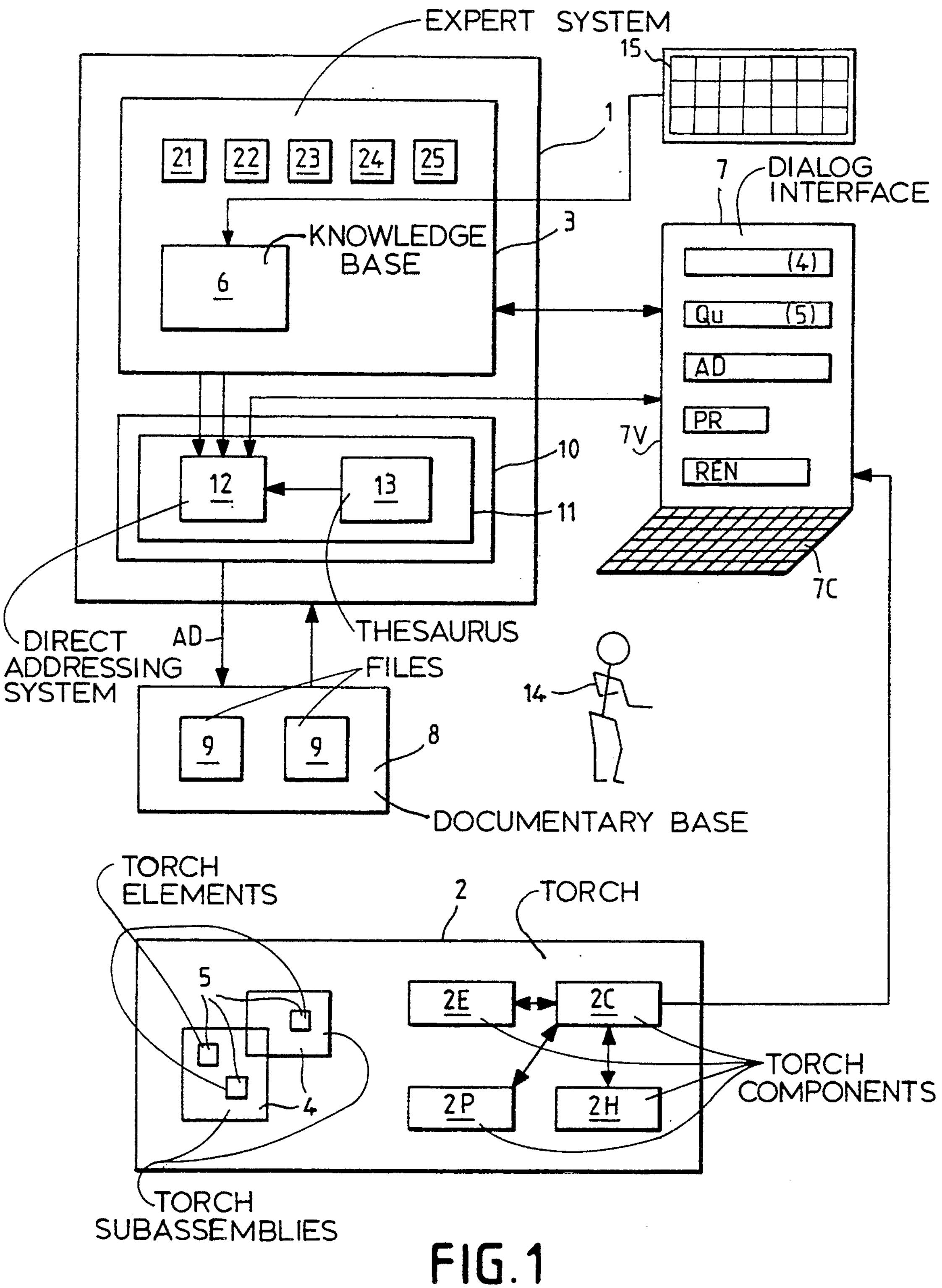
FIG. 1 is a block diagram representing the various components of the maintenance aid device for a plasma torch in accordance with the invention.

The maintenance aid device 1, in accordance with the present invention and represented in FIG. 1, is intended to locate a breakdown in a plasma torch 2.

It is known that a plasma torch is an electrical high-power apparatus, capable of delivering an ionized gas at high temperature. Such a torch may be used to heat the draught for cupola furnaces or blast furnaces, for destroying materials, etc.

Figure 2:
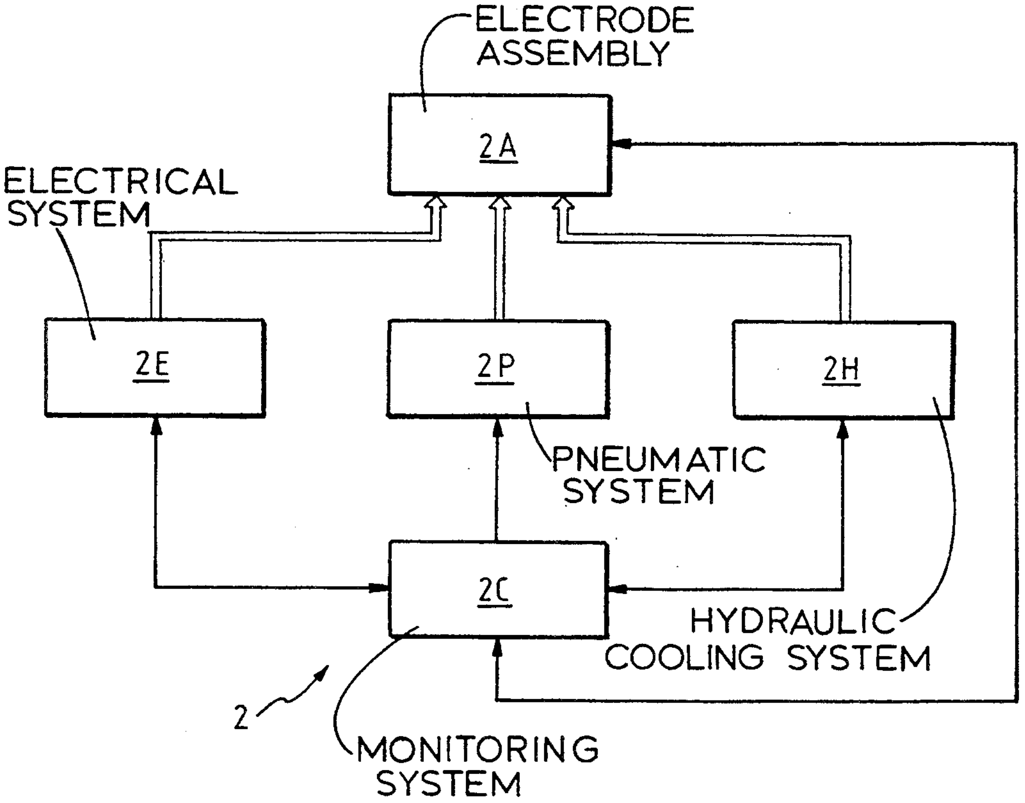
FIG. 2 is the block diagram of a plasma torch.

As FIG. 2 shows diagrammatically, the plasma torch 2 consists in essence of:

- a set 2A of two electrodes, tubular for example, of a gas injection chamber, and of a field coil;
- an electrical system 2E, of the direct current rectifier type, supplying the electrodes and the coil of the field of the assembly 2A;
- a hydraulic system 2H allowing the body of the assembly 2A to be cooled;
- a pneumatic system 2P supplying the assembly 2A with plasma-generating gas; and
- a monitoring system 2C, for example of the automatic type, for monitoring the assemblies 2A, 2E, 2H and 2P.

In the assembly 2A, a plasma-generating gas (air) is injected by the injection chamber and is removed through the downstream electrode. A direct current electric arc is created between the two electrodes, which has the effect of superheating the gas. The electric arc is struck by a starter electrode which short-circuits the two electrodes in an initial phase and then, during striking, withdraws towards the downstream electrode drawing with it the electric arc which then establishes itself in the upstream and downstream electrode.

Due to the high temperatures present at the arc feet, the electrodes are cooled by water (system 2H). In order to avoid any current leakage, the cooling water is demineralized.

A rotational and longitudinal displacement movement of the upstream arc foot is created by the field coil carrying a direct current, so as to prevent the arc foot being immobilized at a single point. The value of the current passing through the coil changes with time so as to wear out the upstream electrode uniformly.

The downstream arc foot is set in rotation by the whirlwind effect of the gas.

The monitoring system 2C permanently communicates with the various assemblies 2E, 2P and 2H:

- monitoring positions, states, measurements, etc.;
- acting on the members (analog datum values, start/-stop, etc.);
- deducing certain simple induced defects.

All the states of its inputs, of its outputs, of its analog values or of its alarms or defects are stored in a data table which can be interrogated by the device 1.

The monitoring system 2C generates messages which are usable by the device 1. It monitors the safety breakdowns of the torch 2 (simple defects) and makes the installation safe in the event of anomalies or breakdowns The device 1, in the course of an investigation, may supply an item of information to the monitoring system 2C, which can correct its prediagnosis, its safety information and, that being so, can retrigger the torch 2 if the defects disappear.

The electrical system 2E, of the direct current rectifier type, may have a power of 4 MW at 3800 V and 1200 A. It is capable of maintaining a blown electric arc by means of a inductance coil. The arc rectifier is controlled in arc intensity and provides current regulation.

The monitoring system 2C manages putting the arc rectifier into operation, the control in intensity and the regulations related to the method employed.

It monitors the correct operation of the rectifier and it can receive the following information:

circuit breaker position,
rectifier status,
power (or other) datum,
arc intensity,
synthesis defect of the rectifier,
torch start command, arc voltage, validation key. It can send out the following orders to the electrical system 2E:

start/stop command, regulation lock/unlock command, arc intensity datum, and it may work out the following simple defects:

striking execution defect, arc blowing defect, arc intensity defect, arc voltage defect, arc rectifier defect.

The defects are often difficult to discern since they appear very rapidly and may be induced by the flow of gas.

The use of the device 1 allows the origin of the defect to be identified more rapidly and more reliably.

The monitoring system 2C is tasked with checking and managing the correct operation of the hydraulic system 2H making it possible to cool the body of the torch. A deficiency in the cooling circuit would give rise to significant heating leading to destruction of the torch connected to the cupola furnace.

The monitoring system 2C may manage the filling of a buffer reservoir, the quality of the water, the starting or the stopping of the circulation pumps, the injection of the demineralized water; it may monitor the flow of water circulating in the torch and the entry and exit temperatures of the torch.

In order to do that, it may receive the following information:

filling valve open, filling pump running, filling pump defective, water level in the reservoir, resistivity of the water, circulation pump running, synthesis defect of the circulation pump, water flow rates in the torch, water entry temperature in the torch, water exit temperature in the torch. The monitoring system 2C can send out the following orders:

filling synthesis command, demineralization synthesis command, circulation pump command, water injection command, and it may work out the following simple defects:

non-execution of the fill command, non-execution of the demineralization command, non-execution of the circulation pump start/stop orders, water temperature raising defect in the torch, defects: water level, resistivity, water entry temperature, water exit temperature, water flow rate.

Moreover, the monitoring system 2C manages the putting into operation of the electro-compressors of the pneumatic system 2P, according to the gas flow rate demanded by the torch, and it manages the gas flow rate which it has to send by means of a regulation valve.

It monitors the states of the compressors, filters, etc.

For this purpose, it may receive the following information:

torch compressor, compressor synthesis defect, filters clogged, drier in service, defective, gas flow rate, gas pressure and temperature.

It may send out the following orders:

compressor start/stop order, gas flow rate datum (valve control), opening/closing order (scavenge valve).

It may work out the following defects:

gas flow rate defect, datum/measurement deviation defect, pressure defect.

The maintenance aid device 1 includes an expert system 3 able to successively determine subassemblies 4 of elements 5, or basic components, constituting the systems 2E, 2P, 2H, this leading to the determination of a defective subassembly 4 comprising the said breakdown and of smaller size to that of the subassembly 4 first determined.

The expert system 3 has available a knowledge base 6 containing the description of the various elements 5 with, in particular, an indication as to whether they are observable or not, that is to say whose the state can be determined directly or indirectly. This expert system 3 also has available, in the knowledge base 6, a topology of the links between the elements 5 and of rules describing the interaction between the various elements 5 of the plasma torch 2. A dialog interface 7 including a visual display console 7V, receives information sent out by said monitoring system 2C relating to a possible breakdown detected by the latter. With this maintenance aid device 1 is associated a documentary base 8 including various files 9 containing information, each relating to a given information type, such as data from the manufacturer of the elements 5, test and repair sheets, diagrams, reliability of the elements 5 and other data, a documentary base 8 which is accessible for reading by addressing means 10 of this maintenance aid device 1, allowing the expert system 3 to address this documentary base 8 from criteria, such as keywords. The addressing means 10 also allow the interface 7 to address said documentary base 8.

The addressing means 10 include a database management system 11 having, in addition to a direct addressing system 12 of the usual type transmitting the address which it receives to memory means of the documentary base 8, a thesaurus 13 containing the pertinent keywords allowing the identity of the subassemblies 4 or elements 5 in question to be determined, from one or more keywords taken separately or in combination, and the address AD of the files 9 containing information relating to these identified subassemblies 4 or elements 5. The output of this thesaurus 13 is linked to one input of the direct addressing system 12, another input of which receives directly usable addresses. The expert system 3 or an operator 14 (by means of the interface 7) may thus send keywords to these addressing means 10, and the latter consequently address the documentary base 8 which delivers back the information contained in the files 9 in question, which may be used by the expert system 3 itself and also visually displayed, after possible processing to incorporate the knowledge from the expert system 3, on a screen of the visual display console 7V, so as to keep the operator 14 informed.

The expert system 3 is linked to the communication interface 7 and operates interactively with the latter, displaying there, on said screen, messages indicating a subassembly 4 grouping together elements 5 at least one of which is likely to be the cause of the breakdown, as well as questions QU to the operator 14. The latter delivers back information REN by means of a keyboard 7C forming part of this communication interface 7 and connected to this visual display console 7V. When it poses the question QU, the expert system 3 indicates, on the screen of the visual display console 7V, the addresses AD of the documentary base 8 containing information relating to the elements 5 which this question QU concerns. Moreover, the visual display of the contents of the stored documentary data on the elements 5 in question may be carried out at the request of the operator 14 by means of the keyboard 7C. Thus a routeing CHE (FIG. 3) is set up, including various steps symbolized by nodes ND separated by branches BR, successively displayed, relating to the identification of the subassemblies 4 suspected of containing one or more broken-down elements 5, leading to a final node ND corresponding to the identification of a defective subassembly 4 whose size cannot be further reduced.

First calculating means 24 of this expert system 3 are provided, preferably able to choose, at any node ND of said routeing CHE, a branch BR corresponding to the information REN which is most easily accessible by the operator 14. These first calculating means 24 include adder means supplied with data weighting the observability difficulty of each element 5 and contained in the knowledge base 6, and calculating the overall observability of the elements 5 of the suspect subassembly 4.

This expert system 3 may include second calculating means 21 so as to automatically indicate a determined procedure for the acquisition of said information REN by the operator 14. These second calculating means 21 include a comparator, associated with a memory containing information relating to each element 5 of the plasma torch 2, receiving the questions QU displayed on the screen of the visual display console 7V and determining, by comparison between these questions QU and the contents of said memory, whether the element or elements 5 which the question QU concerns necessitate the prior use of a specific procedure for the operator 14 to obtain the information requested. In this case, these second calculating means 21 send to the documentary base 8, passing through said other entry of the direct addressing system 12, a specific read address AD for this or these element(s) 5 in question, which forms part of said information contained in this memory.

Third calculating means 22 may be installed in this expert system 3 in order to indicate, on the screen of said visual display console 7V, a probability PR relating to the confidence level attributed to said identification of a defective subassembly 4. This probability PR is determined from information REN supplied by the operator 14 and, as the case may be, by a history of the breakdowns previously suffered by the plasma torch 2. These third calculating means 22 include multiplier and adder means making it possible to calculate the sum of the estimated breakdown probabilities for each element 5 of the suspect subassembly 4. Each probability PR takes account of the estimated reliability of each element 5, determined according to the statistical sampling of the breakdowns, weighted by the estimated probability that the element 5 is defective, having regard to the state of the torch 2 as known from the information REN supplied by the operator 14.

Moreover, this expert system 3 may include fourth calculating means 23 able to make said routeing CHE go back on itself, so as to arrive at the defective subassembly 4 possibly by passing along branches BR not leading to identification of a defective subassembly 4. These fourth calculating means 23 include a descriptor of the routeing CHE at the site of each node ND, including, for each branch BR, the indication of the passage of the routeing CHE into this branch BR, whilst a circuit for analysis of the topology of the branches BR determines, for the node ND in question, from information supplied by the descriptor, whether all the branches BR going to the downstream nodes ND have been traveled, in which case it orders a return to the upstream node ND.

Said history of the various routeings CHE relating to the prior breakdowns is created by using memory means 25 containing information indicating the routeing CHE carried out for a given breakdown, as well as the questions QU posed by the maintenance aid device 1 and the information REN supplied.

The operation of this maintenance aid device 1 is as follows. When a breakdown occurs, its directly observable manifestations are entered by the operator 14 into the maintenance aid device 1 by means of the keyboard 7C, or are entered directly by the monitoring system 2C, which supplies initial information REN. The expert system 3 determines, from this initial information REN, a subassembly 4, marked 4*i* in FIG. 3, consisting of elements 5*i* suspected of having broken down. This subassembly 4*i* constitutes a start node NDi for the routeing CHE. The expert system 3, by means of the screen of the visual display console 7V, then poses one or more questions QU concerning the state of a certain number of elements 5*i*, with a view to determining the state of this subassembly 4*i*, or possibly also relating to the state of elements 5 outside this subassembly 4*i* and whose easily observable state makes it possible to deduce the state of other elements 5*i* contained in this subassembly 4*i*. The operator 14 then has to determine these states and indicate them to the expert system 3, via information REN supplied by means of said keyboard 7C. The determination of the state of an element 5 may, however, raise difficulties. For example, it is necessary to be able to view the documentation from the manufacturer describing the element 5 of which the state is requested. Hence, for an integrated circuit, it is necessary to know the assignment of the various pins in order to ascertain the state of its output. This information is supplied to the operator 14 by interrogation of the documentary base 8 by means of keywords, which are received by the addressing means 10, the latter going to read the required information in the files 9 of the documentary base 8 at the appropriate addresses AD. Similarly, it may be necessary to carry out a defined procedure before going on to observe the state of an element 5. In this case, the second calculating means 21 of the expert system 3 indicate such a necessity on said screen, and the expert system automatically consults the documentary base 8 by using the addressing means 10 to find out the details of this procedure.

Figure 3:
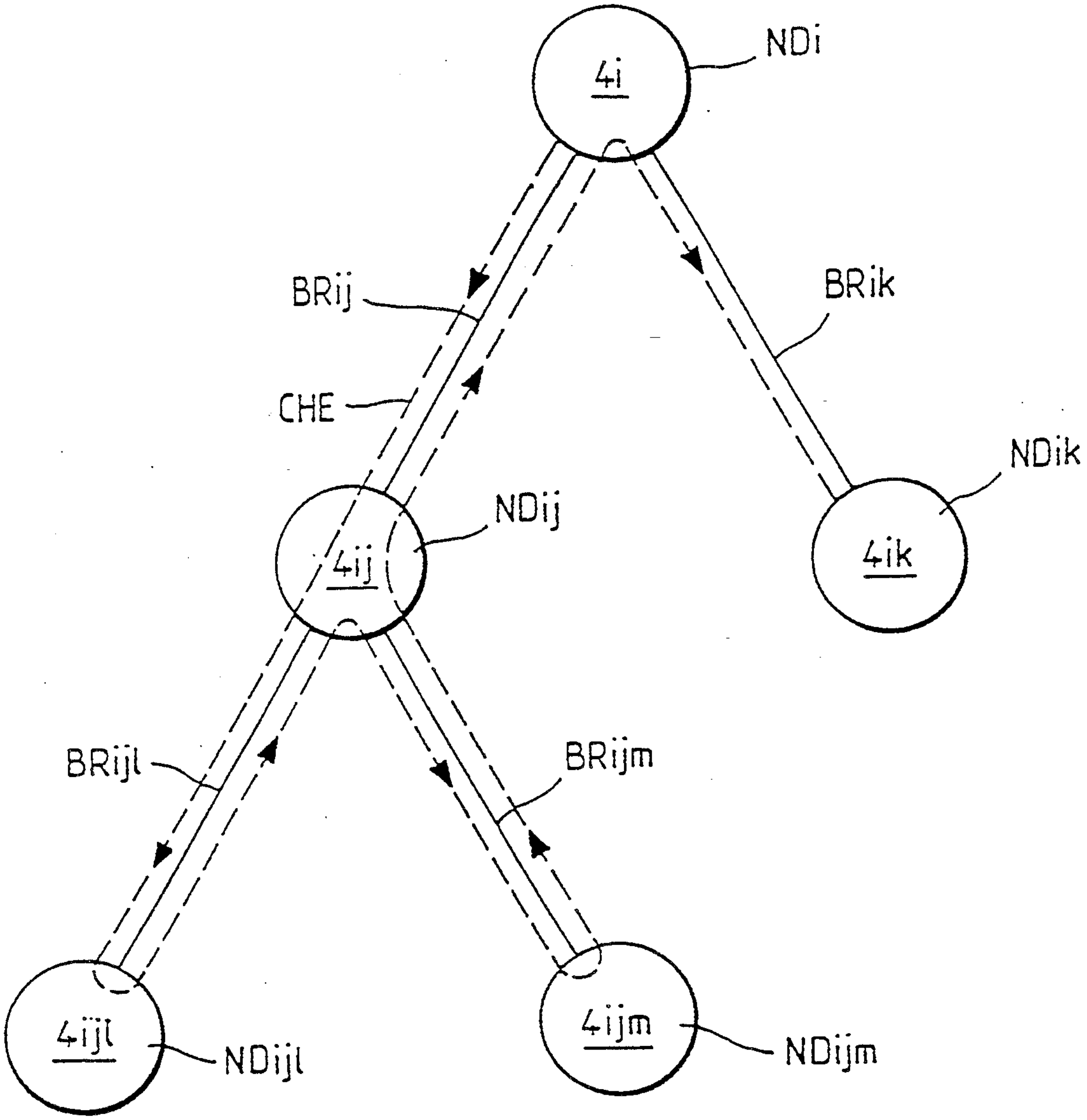
FIG. 3 shows a routeing example for determining a defective subassembly of said torch.

As FIG. 3 shows, the expert system 3 then chooses, from information REN thus obtained originating from the operator 14, a branch BRij attached to this upstream node NDi and going towards a downstream node NDij, concerning a downstream subassembly 4*ij* included in the upstream subassembly 4*i*. As the information REN may, however, be insufficient to make a deterministic choice of this branch BRij, this choice may depend on the probability PR that the third calculating means 22 of the expert system 3 are attributed to this branch BRij, that is to say the probability that the breakdown is due to one of the elements 5*ij* contained in the subassembly 4*ij* relating to the downstream node NDij linked to said branch BRij. It should be noted that a single element 5, in addition to possibly belonging to nodes ND having the same relationship because they are connected in cascade, may also belong to nodes ND with different relationships, which makes the sum of said probabilities PR relating to the various upstream branches BR of a node ND possibly greater than one.

So as statistically to limit the number and the difficulty of the observations of the state of the elements 5, the expert system 3 may also decide to choose, as a priority, by means of the first calculating means 24, the downstream branches BR of the node ND which lead to subassemblies 4 comprising easily observable elements 5, even if it means coming back to an upstream node ND, by using the fourth calculating means 23, if this routeing CHE does not lead to the breakdown being located.

Hence FIG. 3 shows a routeing CHE departing from the node NDi and going to the downstream node NDij via the branch BRij, then to a downstream node NDijl via a branch BRijl. As this node is at the end of a terminal branch, and a breakdown has not been found in the corresponding subassembly 4*ijl*, in this example, the routeing CHE passes back via the branch BRijl in the upstream direction as far as the node NDij, by virtue of the fourth calculating means 23, in order to set off again towards a downstream node NDijm via a branch BRijm. As the breakdown is not found there in the corresponding subassembly 4*ijm*, the routeing CHE again departs towards the closest upstream node ND having at least one branch not yet traveled, that is to say the node NDI, then goes, via a branch BRik, to a downstream node NDik where the breakdown is found in the corresponding subassembly 4*ik*.

Thus a routeing CHE is traveled, leading in general to identification of a defective element 5, replacement or rectification of which causes the breakdown to disappear. The operator 14 may then, using the memory storage means 25, store this routeing CHE with the various information associated with each node ND, so as to constitute a database making it possible to judge the effectiveness of the stored routeings CHE and possibly to improve the rules determining the future routeings CHE.

In order to be able to update the knowledge base 6, a keyboard 15 is provided associated with appropriate calculating means (not represented) and making it possible to ensure coherence of the modifications and/or to complement the contents of said base 6, as experience is gained as to the behavior of the torch 2.

Hence it is seen that, in the device of the present invention, it is possible to use, in order to achieve effectiveness and quality, the unique knowledge acquired with a view to searching for a breakdown, for other expertise besides breakdown repairs, such as documentation search, maintenance of the knowledge base, etc.

We claim:

1. A maintenance aid device for a plasma torch (2) consisting of a plurality of subassemblies (4) of electrical, pneumatic and hydraulic elements (5), comprising:

a knowledge base (6) containing data concerning possible errors within said subassemblies, the causes of said errors, and appropriate methods of repair;

an expert system (3) capable of identifying in successive steps individual subassemblies (4) of decreasing size which are likely to contain a defective element; and a dialog interface (7) between an operator (14) and said expert system (3), said interface being able to send out questions (QU) posed by said expert system for said operator, and to receive from said operator information (REN) intended for said expert system in response to said questions (QU);

said device further including:

a documentary base (8) consisting of a plurality of files (9) containing data concerning specific technical features of said elements (5) forming said subassemblies (4);

addressing means (10) able to receive data identifying a defined element (5) from the dialog interface (7), to read the information relating to this defined element (5) in said documentary base (8), and to supply the latter information to said dialog interface (7); and first calculating means (24), able to choose, at any step (ND) of identification by said expert system (3), a subassembly (4) corresponding to information (REN) which is most easily accessible by the operator (14).

2. The device as claimed in claim 1, wherein said addressing means (10) are able to receive said questions (QU) relating to the state of certain subassemblies (4*i*) automatically from the expert system (3), to read the information relating to these subassemblies (4*i*) in said documentary base (8), and to transmit them to said expert system.

3. The device as claimed in claim 1, which includes second calculating means (21) able to read a defined procedure automatically in said documentary base (8), so that an operator (14) can acquire said information (REN).

4. The device as claimed in claim 1, which includes third calculating means (22) able to indicate a probability (PR) relative to a level of confidence which it attributes to said definition of the defective subassembly (4).

5. The device as claimed in claim 1, which includes fourth calculating means (23) able to cause any step (ND) of subassembly identification to return to a previous step (ND).

6. The device as claimed in claim 1, which includes memory means (25) able to store the history of the succession (CHE) of said steps (ND).

* * * * *